United States Patent [19]

Gmeiner et al.

[11] 4,229,853
[45] Oct. 28, 1980

[54] WINDSHIELD WIPER INSTALLATION FOR MOTOR VEHICLES

[75] Inventors: Günter Gmeiner; Egon Frey, both of Sindelfinger; Josef Berger, Wolfschlugen, all of Fed. Rep. of Germany

[73] Assignee: Daimler-Benz Aktiengesellschaft, Fed. Rep. of Germany

[21] Appl. No.: 971,000

[22] Filed: Dec. 19, 1978

[30] Foreign Application Priority Data

Dec. 20, 1977 [DE] Fed. Rep. of Germany ....... 2756744

[51] Int. Cl.³ .............................................. B60S 1/02
[52] U.S. Cl. .................................................. 15/250.16
[58] Field of Search ........... 15/250.16, 250.17, 250.18, 15/250.19, 250.25, 250.26, 250.27, 250.21

[56] References Cited

U.S. PATENT DOCUMENTS

| | | | |
|---|---|---|---|
| 2,759,214 | 8/1956 | Madunich | 15/250.16 |
| 3,213,478 | 10/1965 | Pollock | 15/250.16 |
| 3,843,194 | 10/1974 | Yamada | 15/250.16 |
| 3,851,351 | 12/1974 | Pickles | 15/250.27 |

*Primary Examiner*—Edward J. McCarthy
*Attorney, Agent, or Firm*—Craig and Antonelli

[57] ABSTRACT

A windshield wiper installation for motor vehicles, in which wiper arms together with wiper blades which are driven from an electric motor by way of linkage members and wiper shafts, are disposed in the parked position thereof inside of a well in the cowl of the body in front of the windshield; the driving members for the wiper arms are thereby so constructed that the wiper arms together with the wiper blades are manually movable out of their parking position in the wiping direction through a predetermined angular path and subsequently are movable back into the parked position.

8 Claims, 5 Drawing Figures

WINDSHIELD WIPER INSTALLATION FOR MOTOR VEHICLES

The present invention relates to a windshield wiper installation for motor vehicles, in which the wiper arms together with the wiper blades which are driven by way of an electric gear motor, linkage members and wiper shafts, are disposed in the parking position inside of a well in the cowl of the body in front of the windshield.

With windshield wiper installations having wiper arms and wiper blades arranged recessed in such a manner, a blocking of the installation may occur by ice or snow, when the wiper arms are returned into the parking position and snow or ice is wiped into the well. Additionally, it is disadvantageous that an exchange of the wiper blades and a cleaning of the well is possible as a rule only with an opened engine hood or with a removed covering.

The present invention is concerned with the task to eliminate the described disadvantages, and the solution to the underlying problems essentially consists in that the driving members for the wiper arms are so constructed that the wiper arms together with their wiper blades are manually movable from their parking position in the wiping direction through a predetermined angular path and subsequently are movable back into the parking position.

It becomes possible by the present invention in an advantageous manner to render an installation blocked by ice or snow operable again in that the wiper arms are manually disengaged out of the well and are pivoted out of the same and the well can then be cleaned of stuck ice or snow. It is also readily possible with wiper arms manually pivoted out of the well to exchange the wiper blades without having to set the installation into operation.

According to another feature of the inventive subject matter, springy or elastic means may be provided advantageously, with the aid of which the wiper arms which had been manually pivoted out of the parking position, are automatically pivoted back into the parking position after releasing the same.

In one structurally favorable embodiment, the linkage members may be constructed as telescopic rods, of which one rod part is adapted to be lengthened, respectively, shortened with respect to the other rod part against spring pressure by a distance or travel limited by abutments.

According to another embodiment of the present invention, each swing-arm crank of each wiper shaft may be subdivided into a swing-arm crank part connected with the wiper shaft and into a swing-arm crank part connected with the linkage members and both swing-arm crank parts may be connected with each other by a spiral spring which during the operation of the windshield wiper installation assures a non-rotatable connection of the swing-arm crank parts and against whose action the wiper arm disposed in the parked position together with the associated swing-arm crank part is movable with respect to the other swing-arm part through a predetermined angular path.

However, a slip clutch or a tooth clutch loaded by a spring may be interconnected into each wiper shaft.

Accordingly, it is an object of the present invention to provide a windshield wiper installation for motor vehicles which avoids by simple means the aforementioned shortcomings and drawbacks encountered in the prior art.

Another object of the present invention resides in a windshield wiper installation for motor vehicles which facilitates a deblocking of the installation blocked by ice or snow.

A further object of the present invention resides in a windshield wiper system for motor vehicles whose wiper arms and wiper blades are adapted to be parked within a well in the cowl of the vehicle body, which not only facilitates the exchange of the wiper blades without setting the system into operation but also simplifies the cleaning of and removal of ice or snow from the well in the cowl.

Still a further object of the present invention resides in a windshield wiper installation for motor vehicles of the type described above which is simple in construction, reliable in operation and easy to service.

These and other objects, features and advantages of the present invention will become more apparent from the following description when taken in connection with the accompanying drawing which shows, for purposes of illustration only, several embodiments in accordance with the present invention, and wherein.

Figure 1:
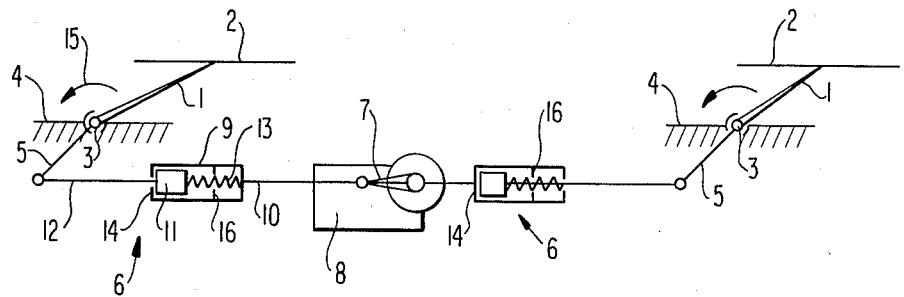
FIG. 1 is a schematic view of a windshield wiper installation with telescopic rods according to the present invention in the drive system thereof.

Referring now to the drawing wherein like reference numerals are used throughout the various views to designate like parts, according to FIG. 1, the wiper arms 1 together with wiper blades 2 of a windshield wiper installation for motor vehicles are rotatably supported by means of wiper shafts 3 in wiper bearings 4 in such a manner that the wiper arms 1 together with the wiper blades 2 lie in the parking position inside of a well or compartment in the cowl of the body in front of the windshield. Swing-arm cranks 5 are non-rotatably connected with the wiper shafts 3; telescopic rods generally designated by reference numeral 6 engage at the swing-arm cranks 5. The telescopic rods 6 are pivotally connected to the drive crank 7 of an electric gear motor 8.

Each telescopic rod 6 consists of a rod part 10 including a cylinder 9 and of a rod part 12 including a piston 11. The piston 11 is guided inside of the cylinder 9 and is spring-loaded by a compression spring 13 in such a manner that the piston 11 is pressed against an abutment 14. The compression spring 13 is so strong that during an operation of the windshield wiper installation the telescopic rods 6 behave like rigid parts.

If the wiper arms 1 together with the wiper blades 2 become stuck in the well of the body as a result of ice or snow or if it is necessary to clean the well, then the wiper arms 1 can be seized by hand and can be pivoted in the wiping direction 15 against the effect of the compression springs 13, and more particularly so far until the pistons 11 abut at abutments 16. The location of the abutments 16 is so dimensioned that the wiper arms 1 can be pivoted sufficiently far out of the well in order to make the latter readily accessible.

Figure 2:
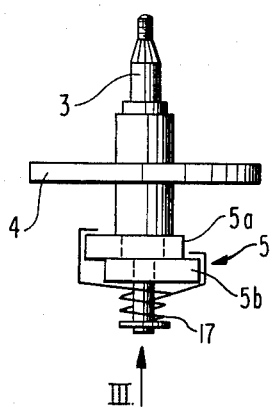
FIG. 2 is a plan view on a wiper shaft subdivided into two parts according to the present invention, in which the two parts are connected by a spiral spring.
Figure 3:
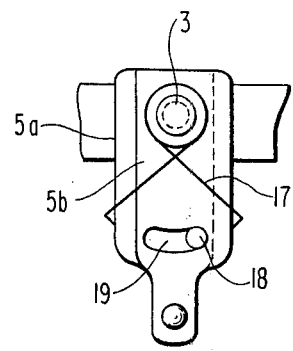
FIG. 3 is an elevational view of the wiper shaft taken in the direction of arrow III of FIG. 2.

If in lieu of the telescopic rods 6, customary rods are used in the drive system, then a pivoting of the wiper arms 1 can be achieved in that according to FIGS. 2 and 3, each swing-arm crank 5 is subdivided into a swing-arm crank part 5a connected with the respective wiper shaft 3 and into a swing-arm crank part 5b connected with the drive rod and rotatably supported on the wiper shaft 3. The two swing-arm crank parts 5a and 5b are connected with each other by a spiral spring 17 in such a manner that the spiral spring 17 presses the swing-arm crank part 5b against an abutment pin 18 which engages in an aperture 19 in the swing-arm crank part 5b.

During operation of the windshield wiper installation, the swing-arm crank parts 5a and 5b assume the position relative to one another as shown in the drawing. For purposes of pivoting a wiper arm out of the well, the swing-arm crank part 5a is so displaced together with the wiper arm and the wiper shaft against the action of the spiral spring 17 until the abutment pin 18 abuts at the other end of the aperture 19.

Figure 4:
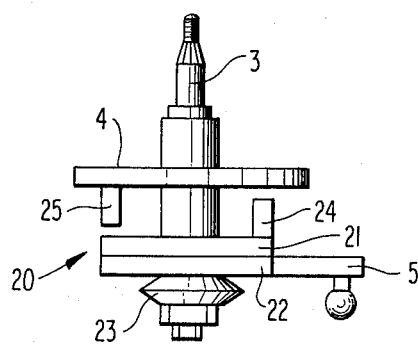
FIG. 4 is a schematic plan view on a modified embodiment of a wiper shaft in accordance with the present invention equipped with an interconnected slip-clutch.

In the case of the embodiment according to FIG. 4, a slip clutch generally designated by reference numeral 20 is interconnected in the wiper shaft 3, which consists of a clutch disk 21 non-rotatable with the wiper shaft 3 and of a clutch disk 22 non-rotatably connected with the swing-arm crank 5. Both clutch disks 21 and 22 are pressed against one another by cup springs 23. An abutment pin 24 at the clutch disk 22 limits by abutment at the abutment pin 25 fixed at the wiper bearing 4 a manual pivoting of the wiper arm together with the wiper shaft 3 and the clutch disk 21 relative to the fixed clutch disk 22.

Figure 5:
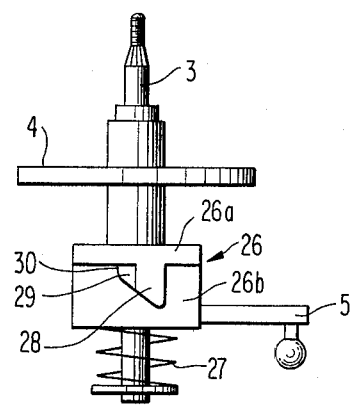
FIG. 5 is a plan view on a still further modified embodiment of a wiper shaft in accordance with the present invention with interconnected tooth clutch.

In the embodiment according to FIG. 5, a tooth clutch 26 is interconnected into the wiper shaft 3 which is spring-loaded by a spring 27. A tooth clutch part 26a provided with at least one tooth 28 is non-rotatably connected with the wiper shaft 3 and engages into a tooth gap 29 provided in a tooth-clutch part 26b non-rotatably connected with the swing-arm crank 5. Both the tooth 28 as also the tooth gap 29 are provided with inclined surfaces. The tooth gap 29 is thereby so dimensioned that the tooth 28 together with the tooth clutch part 26a and the wiper shaft 3 can be displaced through a predetermined angular path, and more particular so far until the tooth 28 abuts against the abutment 30 at the end of the inclined surface of the tooth gap 29 while pushing away the tooth clutch part 26b. After releasing the wiper arm, all parts of the tooth clutch 26 assume again the position shown in the drawing.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A windshield wiper installation for motor vehicles, comprising wiper arm means having wiper blade means, drive means for the wiper arm and wiper blade means including a driving motor, linkage means and wiper shaft means, the wiper arm means together with the wiper blade means being operable to be parked inside of a well in the cowl of the body in front of the windshield, characterized in that the drive means for the wiper arm means are so constructed that the wiper arm means together with the wiper blade means are manually movable out of their parking position in the wiping direction through a predetermined angular path and subsequently are movable back into the parking position.

2. A windshield wiper installation according to claim 1, characterized in that said driving motor is an electric gear motor.

3. A windshield wiper installation according to claim 1, characterized in that said drive means includes further means enabling limited movement of the wiper arm means out of their parking position.

4. A windshield wiper installation according to claim 1, characterized in that said drive means includes elastic means, with the aid of which the wiper arm means pivoted manually out of the parking position are automatically pivoted back into the parking position after release thereof.

5. A windshield wiper installation according to claim 1 or 4, characterized in that the linkage means includes telescopic means, of which one telescopic part is operable to be lengthened, respectively, shortened with respect to the other telescopic part against spring pressure by a distance delimited by abutments.

6. A windshield wiper installation according to claim 1 or 4, characterized in that the drive means includes swing-arm crank means for each wiper shaft means, each swing-arm crank means being subdivided into a swing-arm crank part connected with the wiper shaft means and into a swing-arm crank part connected with the linkage means, the two swing-arm crank parts being operatively connected with each other by a spiral spring means which during operation of the windshield wiper installation ensures a non-rotatable connection of the swing-arm crank parts, said wiper arm means disposed in the parking position being movable together with its associated swing-arm crank part with respect to the other swing-arm crank part through a predetermined angular path against the action of the spiral spring means.

7. A windshield wiper installation according to claim 1, characterized in that a slip-clutch means is interconnected into each wiper shaft means, the slip-clutch means being spring-loaded by a spring.

8. A windshield wiper installation according to claim 1, characterized in that a tooth clutch means spring-loaded by a spring is interconnected into each wiper shaft means.

* * * * *